US010782520B2

United States Patent
Crespo et al.

(10) Patent No.: US 10,782,520 B2
(45) Date of Patent: Sep. 22, 2020

(54) CLEANING SYSTEM FOR VEHICLE SENSOR

(71) Applicant: Ford Global Technologies, LLC, Dearborn, MI (US)

(72) Inventors: Jose Garcia Crespo, Bloomfield Township, MI (US); William Ethan-Alexander McClure, Clawson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

(21) Appl. No.: 16/044,087

(22) Filed: Jul. 24, 2018

(65) Prior Publication Data

US 2020/0033592 A1   Jan. 30, 2020

(51) Int. Cl.
| | |
|---|---|
| *G02B 27/00* | (2006.01) |
| *B60R 11/04* | (2006.01) |
| *A46B 13/02* | (2006.01) |
| *H04N 5/225* | (2006.01) |
| *B60S 1/56* | (2006.01) |

(52) U.S. Cl.
CPC .......... *G02B 27/0006* (2013.01); *A46B 13/02* (2013.01); *B60R 11/04* (2013.01); *B60S 1/566* (2013.01); *H04N 5/2252* (2013.01)

(58) Field of Classification Search
CPC ..... G02B 27/0006; A46B 13/02; A46B 13/04; B60S 1/566
USPC ......................................................... 359/507
See application file for complete search history.

(56) References Cited

U.S. PATENT DOCUMENTS

| | | | |
|---|---|---|---|
| 6,527,000 B1* | 3/2003 | Randmae | B08B 3/024 |
| | | | 134/102.1 |
| 8,567,963 B1* | 10/2013 | Criscuolo | B08B 1/006 |
| | | | 359/507 |
| 9,731,688 B2* | 8/2017 | Doorley | B60S 1/56 |
| 9,880,382 B1 | 1/2018 | Tippy et al. | |
| 10,286,880 B2* | 5/2019 | Schmidt | B60R 16/08 |
| 10,391,981 B2* | 8/2019 | Schmidt | G02B 27/0006 |
| 10,549,723 B2* | 2/2020 | Baldovino | B60S 1/548 |
| 10,549,726 B2* | 2/2020 | Garcia Crespo | G05D 1/02 |
| 10,589,724 B2* | 3/2020 | Krishnan | G05D 1/0257 |
| 2002/0139394 A1* | 10/2002 | Bronson | G02B 27/0006 |
| | | | 134/6 |
| 2015/0344001 A1 | 12/2015 | Lopez Galera et al. | |
| 2016/0244028 A1 | 8/2016 | Wakatsuki | |
| 2017/0056932 A1 | 2/2017 | Tanaka | |
| 2017/0313287 A1 | 11/2017 | Davies et al. | |
| 2018/0154869 A1* | 6/2018 | Yamanaka | G02B 27/0006 |
| 2018/0244245 A1* | 8/2018 | Schmidt | B60S 1/0888 |

(Continued)

FOREIGN PATENT DOCUMENTS

| | | |
|---|---|---|
| WO | 2016004936 A1 | 1/2016 |
| WO | 2017115506 A1 | 7/2017 |

*Primary Examiner* — Ricky D Shafer
(74) *Attorney, Agent, or Firm* — Frank A. MacKenzie; Bejin Bieneman PLC

(57) ABSTRACT

A cleaning system includes an actuator and an arm rotatable by the actuator. The actuator includes a housing and a rotatable barrier in the housing defining a first chamber and a second chamber. The rotatable barrier is rotatable by relative pressures of the chambers. The arm includes a first nozzle fluidly connected to the first chamber and a second nozzle fluidly connected to the second chamber.

14 Claims, 4 Drawing Sheets

(56) References Cited

U.S. PATENT DOCUMENTS

2018/0354468 A1* 12/2018 Krishnan .................. B60S 1/56
2018/0361997 A1* 12/2018 Schmidt ................ G02B 27/00

* cited by examiner

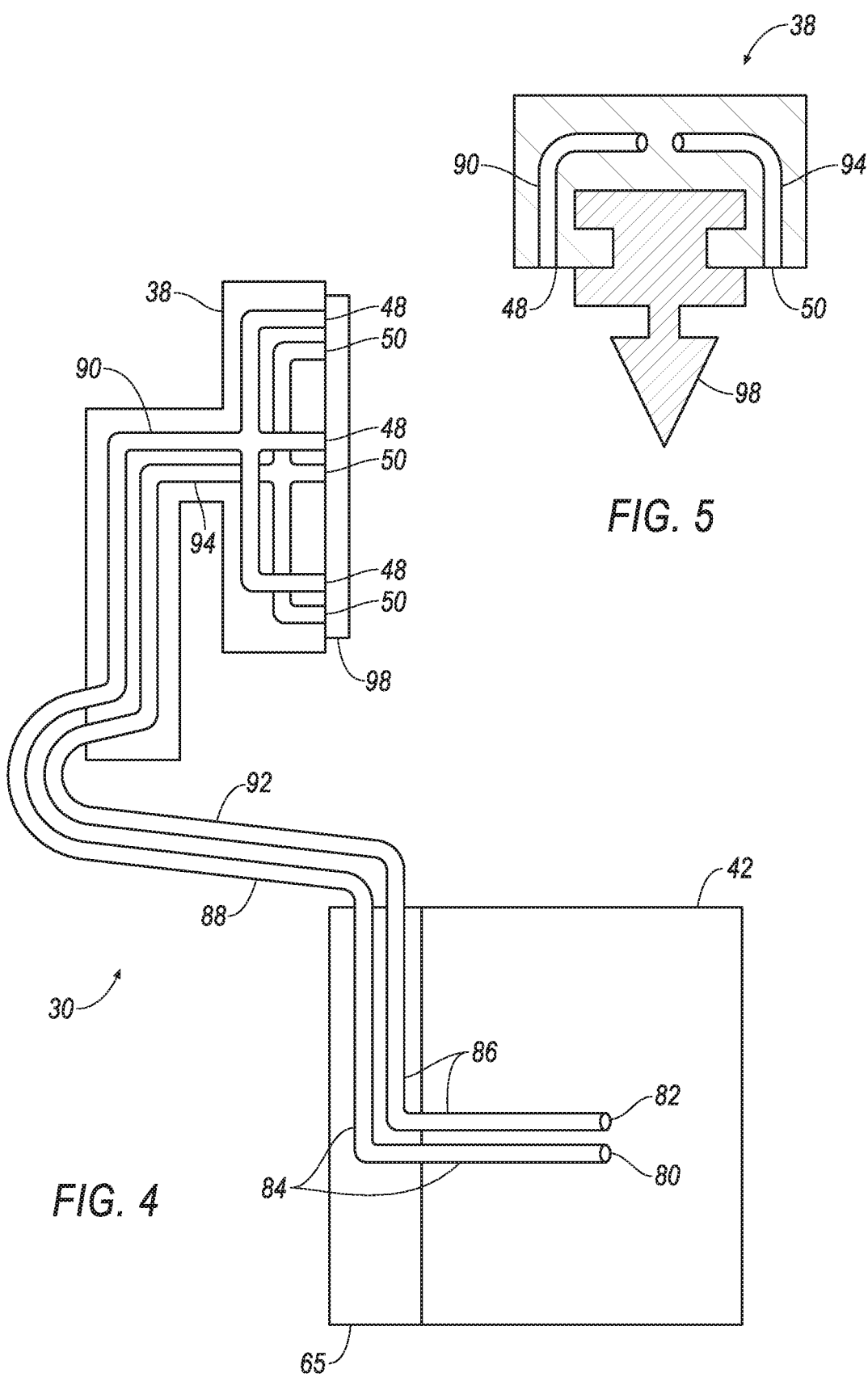

CLEANING SYSTEM FOR VEHICLE SENSOR

BACKGROUND

Autonomous vehicles typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices. When sensor lenses, covers, and the like become dirty, smudged, etc., sensor operation can be impaired or precluded.

BRIEF DESCRIPTION OF THE DRAWINGS

FIG. 4 is a schematic view of the cleaning system of FIG. 2.

FIG. 5 is a top cross-sectional view of an arm of the cleaning system of FIG. 2.

DETAILED DESCRIPTION

Figure 1:
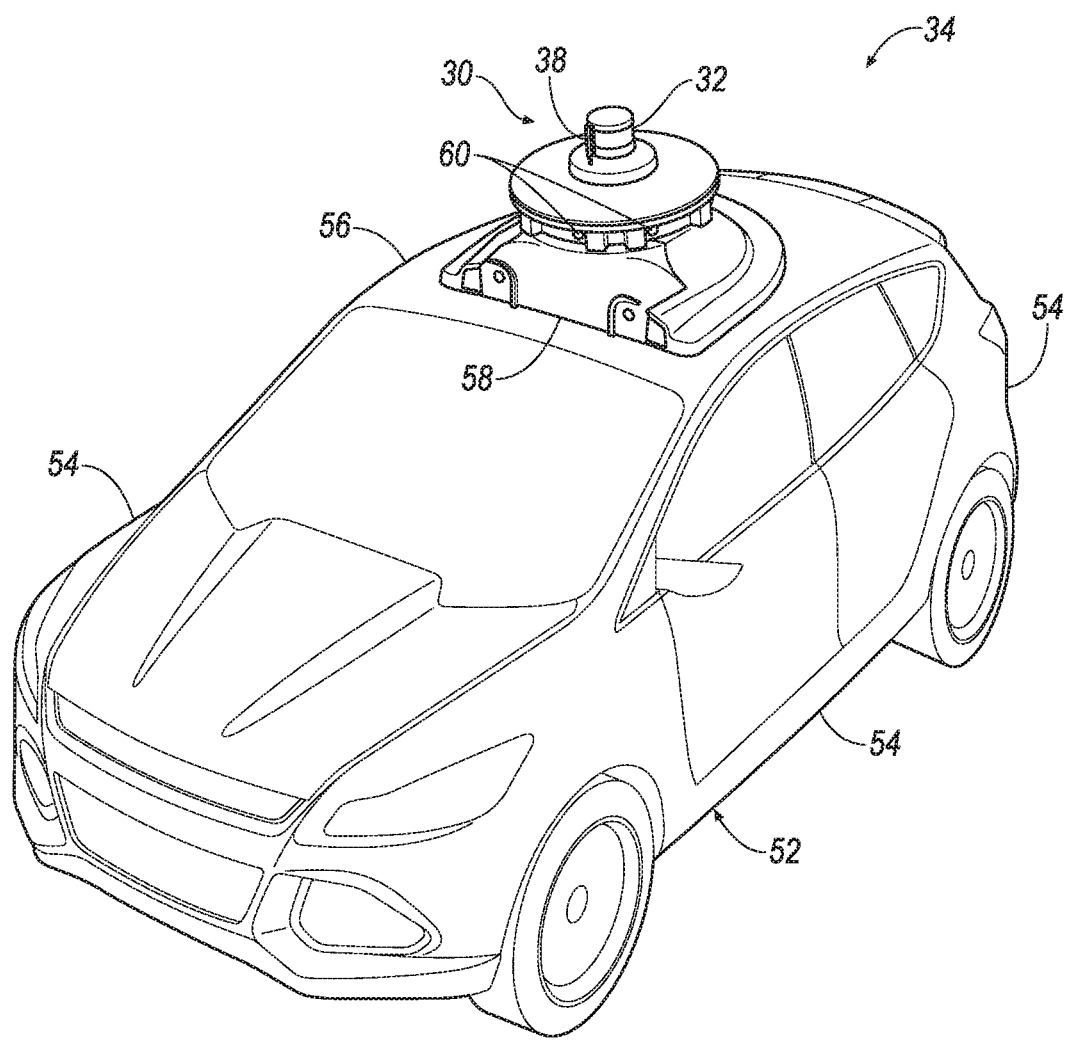
FIG. 1 is a perspective view of an example vehicle.

A cleaning system includes an actuator and an arm rotatable by the actuator. The actuator includes a housing and a rotatable barrier in the housing defining a first chamber and a second chamber. The rotatable barrier is rotatable by relative pressures of the chambers. The arm includes a first nozzle fluidly connected to the first chamber and a second nozzle fluidly connected to the second chamber.

The arm may include a wiper blade. The first and second nozzles may be positioned to emit fluid on respective first and second sides of the wiper blade.

The housing may include a cylindrical outer wall, the actuator may include a central shaft, and the rotatable barrier may extend from the central shaft to the outer wall. The actuator may include a fixed barrier extending from the central shaft to the outer wall. The rotatable barrier may be rotatable about an axis defined by the central shaft from a first position through a rotational sweep of at least 270° to a second position. The fixed barrier may be outside the rotational sweep of the rotatable barrier. The housing may include a first housing inlet to the first chamber outside the rotational sweep and a second housing inlet to the second chamber outside the rotational sweep, and the fixed barrier may be between the housing inlets.

The rotatable barrier may include a first barrier inlet facing the first chamber and fluidly connected to the first nozzle, and a second barrier inlet facing the second chamber and fluidly connected to the second nozzle. The actuator may include a central shaft defining an axis about which the rotatable barrier is rotatable, a first channel extending from the first barrier inlet through the rotatable barrier and central shaft and fluidly connected to the first nozzle, and a second channel extending from the second barrier inlet through the rotatable barrier and central shaft and fluidly connected to the second nozzle.

A liquid pump is fluidly connected to the first chamber.

A gas compressor is fluidly connected to the second chamber.

The cleaning system may further include a cylindrical sensor window, and the arm may be rotatable about an axis defined by the sensor window. The arm may include a wiper blade oriented axially relative to the sensor window.

A cleaning system includes a rotatable arm including a first nozzle and a second nozzle; first and second pressurized-fluid sources; means, powered by the first pressurized-fluid source, for rotating the arm a first direction and transmitting fluid through the first nozzle; and means, powered by the second pressurized-fluid source, for rotating the arm a second direction and transmitting fluid through the second nozzle.

The cleaning system may further include a cylindrical sensor window, and the arm may be rotatable about an axis defined by the sensor window. The arm may include a wiper blade oriented axially relative to the sensor window. The first and second nozzles may be positioned to emit fluid toward respective first and second sides of the wiper blade.

The first pressurized-fluid source is a liquid source, and the second pressurized-fluid source is a gas source.

As illustrated in the various figures, a cleaning system 30 for a first sensor 32 of a vehicle 34 includes an actuator 36 and an arm 38 rotatable by the actuator 36. The actuator 36 includes a housing 40 and a rotatable barrier 42 in the housing 40 defining a first chamber 44 and a second chamber 46. The rotatable barrier 42 is rotatable by relative pressures of the chambers. The arm 38 includes at least one first nozzle 48 fluidly connected to the first chamber 44 and at least one second nozzle fluidly connected to the second chamber 46.

The cleaning system 30 can remove obstructions and debris from the first sensor 32, which improves the operation of the first sensor 32 as well as of autonomous or semi-autonomous operation of the vehicle 34 that relies on the first sensor 32. Moreover, the cleaning system 30 is cost-effective and energy-efficient. The rotation of the arm 38 is driven by a same fluid that is sprayed out of the first or second nozzles 48, 50. For the purposes of this disclosure, "fluid" is defined as a substance in which the component particles can move past one another, e.g., a gas or a liquid. The cleaning system 30 thus does not require electricity to be supplied. Accordingly, a motor is not needed to operate the cleaning system 30. The cleaning system 30 can have longer life as well as reduced noise and vibration.

With reference to FIG. 1, the vehicle 34 may be an autonomous vehicle. A computer can be programmed to operate the vehicle 34 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering without input from a human driver; semi-autonomous operation means the computer controls one or two of the propulsion, brake system, and steering and a human driver controls the remainder; and nonautonomous operation means a human driver controls the propulsion, brake system, and steering.

The vehicle 34 includes a body 52. The vehicle 34 may be of a unibody construction, in which a frame and the body 52 of the vehicle 34 are a single component. The vehicle 34 may, alternatively, be of a body-on-frame construction, in which the frame supports the body 52, which is a separate component from the frame. The frame and body 52 may be formed of any suitable material, for example, steel, aluminum, etc. The body 52 includes body panels 54, 56 partially defining an exterior of the vehicle 34. The body panels 54, 56 may present a class-A surface, e.g., a finished surface exposed to view by a customer and free of unaesthetic blemishes and defects. The body panels 54, 56 include, e.g., a roof 56, etc.

A casing 58 for second sensors 60 is attachable to the vehicle 34, e.g., to one of the body panels 54, 56 of the vehicle 34, e.g., the roof 56. For example, the casing 58 may be shaped to be attachable to the roof 56, e.g., may have a shape substantially matching a contour of the roof 56 or otherwise facilitating mounting or attachment. The casing 58 may be attached to the roof 56, which can provide the second sensors 60 with an unobstructed field of view of an area around the vehicle 34. The housing 40 and casing 58, including respective parts or elements thereof discussed herein, may be formed of, e.g., plastic or metal.

Figure 2:
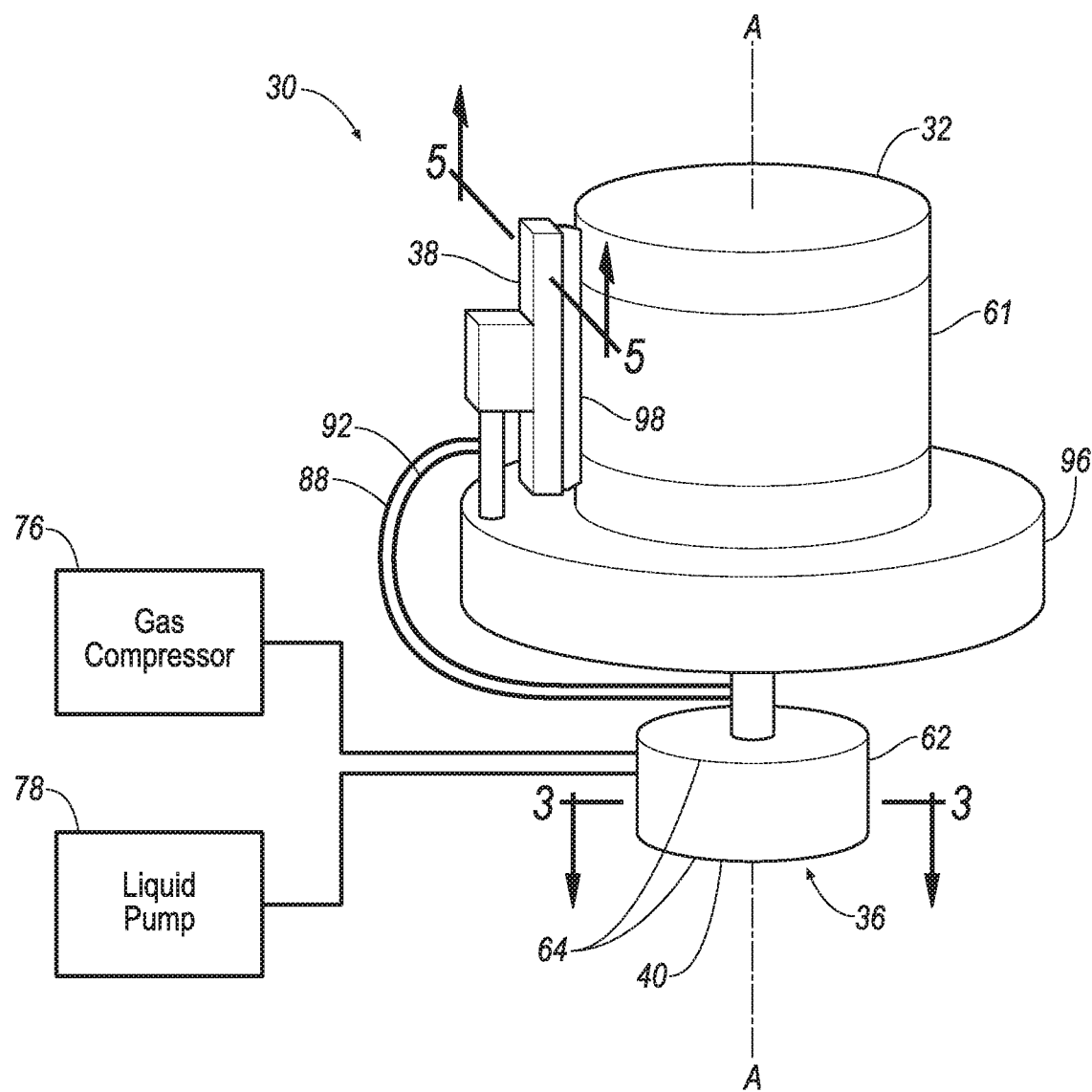
FIG. 2 is a perspective view of a cleaning system and a sensor of the vehicle of FIG. 1.

With reference to FIGS. 1 and 2, the first sensor 32 may provide data to detect the location and/or orientation of the vehicle 34. For example, the first sensor 32 may be a global positioning system (GPS) sensors; accelerometer such as piezo-electric or microelectromechanical systems (MEMS); gyroscope such as rate, ring laser, or fiber-optic gyroscopes; inertial measurements unit (IMU); or magnetometer. The first sensor 32 may detect the external world, e.g., objects and/or characteristics of surroundings of the vehicle 34, such as other vehicles, road lane markings, traffic lights and/or signs, pedestrians, etc. For example, the first sensor 32 may be a radar sensor, scanning laser range finder, light detection and ranging (LIDAR) device, or image processing sensor such as a camera. In particular, the first sensor 32 may be a LIDAR device. A LIDAR device detects distances to objects by emitting laser pulses and measuring the time of flight for the pulse to travel to the object and back.

The first sensor 32 may be exposed outside the casing 58. The first sensor 32 may be supported by the casing 58. The first sensor 32 may be mounted indirectly to the roof 56 via the casing 58. The first sensor 32 may have a cylindrical shape oriented vertically, i.e., an axis A of the cylindrical shape is substantially vertical. The first sensor 32 may include a cylindrical sensor window 61 extending about an exterior of the first sensor 32. The sensor window 61 may define the axis A. The first sensor 32 may have a 360° horizontal field of view through the sensor window 61.

With reference to FIG. 2, the actuator 36 includes the housing 40. The actuator 36 may be positioned below the first sensor 32 and inside the casing 58. The housing 40 includes a cylindrical outer wall 62 and two end walls 64. The cylindrical shape of the housing 40 may be centered on the axis A.

Figure 3:
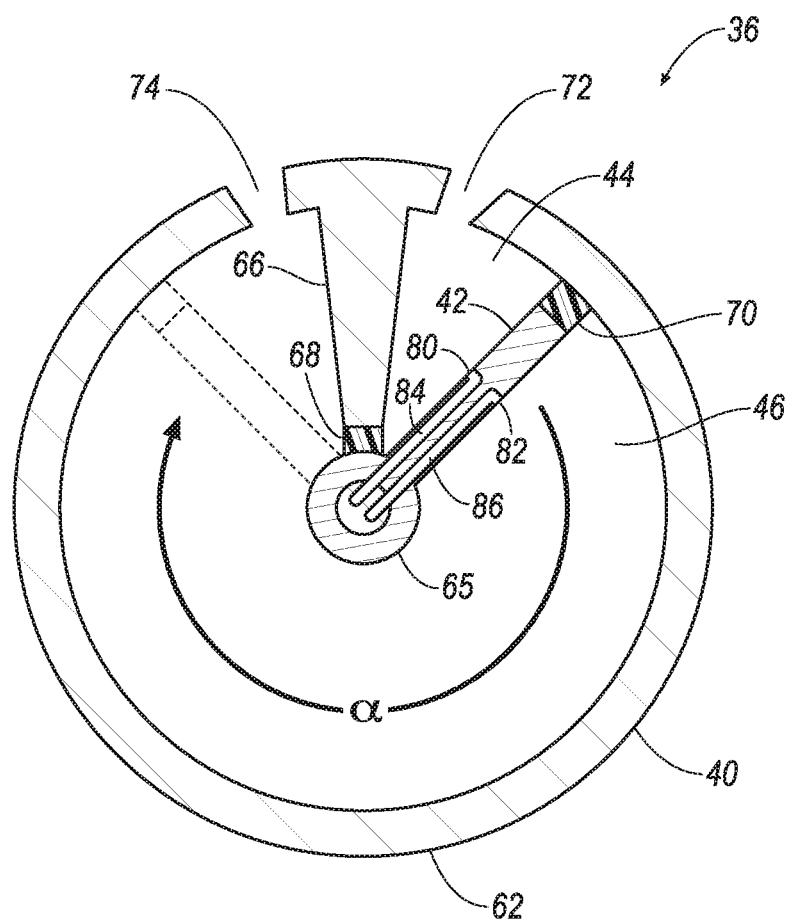
FIG. 3 is a top cross-sectional view of an actuator of the cleaning system of FIG. 2.

With reference to FIG. 3, the actuator 36 includes a central shaft 65. The central shaft 65 is elongated along the axis A from one of the end walls 64 to the other of the end walls 64. The central shaft 65 may thus define the axis A. The central shaft 65 may be rotatable relative to the housing 40.

The actuator 36 includes a fixed barrier 66 extending from the central shaft 65 to the outer wall 62 and extending from one of the end walls 64 to the other of the end walls 64. The fixed barrier 66 may be attached to the outer wall 62 and the end walls 64 in a watertight and/or airtight manner. For example, the fixed barrier 66 may be integral with the outer wall 62 and/or the end walls 64. For the purposes of this disclosure, "integral" is defined as made of a single, substantially uniform piece of material with no seams, joints, fasteners, or adhesives holding it together.

A fixed-barrier seal 68 may extend between the fixed barrier 66 and the central shaft 65. The fixed-barrier seal 68 may form a substantially watertight and/or airtight seal with the fixed barrier 66 and with the central shaft 65. The fixed-barrier seal 68 may be attached to the fixed barrier 66, e.g., with adhesive. The central shaft 65 may slide against the fixed-barrier seal 68 when rotating. The fixed-barrier seal 68 may be made of an elastomeric material such as rubber.

The actuator 36 includes the rotatable barrier 42. The rotatable barrier 42 extends from the central shaft 65 to the outer wall 62 and from one of the end walls 64 to the other of the end walls 64. The rotatable barrier 42 may be attached to the central shaft 65 in a watertight and/or airtight manner. For example, the rotatable barrier 42 may be integral with the central shaft 65.

A rotatable-barrier seal 70 may extend between the rotatable barrier 42 and the outer wall 62, as well as between the rotatable barrier 42 and the end walls 64. The rotatable-barrier seal 70 may form a substantially watertight and/or airtight seal with the rotatable barrier 42, the outer wall 62, and the end walls 64. The rotatable-barrier seal 70 may be attached to the rotatable barrier 42, e.g., with adhesive. The rotatable-barrier seal 70 may slide against the outer wall 62 and the end walls 64 when the rotatable barrier 42 rotates. The rotatable-barrier seal 70 may be made of an elastomeric material such as rubber.

The rotatable barrier 42, the fixed barrier 66, and the housing 40 define and enclose the first chamber 44 and the second chamber 46. The rotatable barrier 42 and the fixed barrier 66 divide a volume enclosed by the housing 40 into the first chamber 44 and the second chamber 46. The rotatable barrier 42 and the fixed barrier 66 fluidly isolate the first chamber 44 from the second chamber 46 (i.e., fluid cannot pass from one to the other).

The rotatable barrier 42 is rotatable about the axis A defined by the central shaft 65 from a first position through a rotational sweep a to a second position. The fixed barrier 66 is outside the rotational sweep a. For example, the rotational sweep a may be at least 270°. As the rotatable barrier 42 rotates from the first position toward the second position (as shown in solid lines and hidden lines, respectively, in FIG. 3), the volume of the first chamber 44 increases and the volume of the second chamber 46 decreases. The volume $V_1$ of the first chamber 44 is approximately equal to $\pi*R^2*L*\theta/360°$, in which R is a radial distance from the axis A to the outer wall 62, L is a length of the housing 40 from one end wall to the other end wall, and θ is an angle in the first chamber 44 formed by the fixed barrier 66 and the rotatable barrier 42, measured in degrees. The volume $V_2$ of the second chamber 46 is approximately equal to $\pi*R^2*L*(360°-\theta)/360°$.

The housing 40 includes a first housing inlet 72 to the first chamber 44 and a second housing inlet 74 to the second chamber 46. The first housing inlet 72 and the second housing inlet 74 are outside the rotational sweep a. By being outside the rotational sweep a, the first housing inlet 72 leads to the first chamber 44 regardless of the position of the rotatable barrier 42, and the second housing inlet 74 leads to the second chamber 46 regardless of the position of the rotatable barrier 42. The fixed barrier 66 is between the housing inlets 72, 74. The fixed barrier 66 and the rotatable barrier 42 fluidly isolate the first housing inlet 72 from the second housing inlet 74.

Returning to FIG. 2, two pressurized-fluid sources are fluidly connected to the first chamber 44 and the second chamber 46, respectively. For example, as shown in FIG. 2, the pressurized-fluid sources may be a liquid pump 78 and a gas compressor 76 supplying a gas and a liquid, respectively. Alternatively, the pressurized-fluid sources may both supply liquids or both supply gases.

The liquid pump 78 is fluidly connected to the first chamber 44 via the first housing inlet 72. The liquid pump 78 is a pressurized-fluid source, specifically a liquid source. The liquid may be, e.g., washer fluid, which may include solvents, detergents, diluents such as water, etc. The liquid pump 78 may be any suitable type of pump, e.g., a positive-displacement pump such as a rotary-type, reciprocating-type, or linear-type pump; a centrifugal pump; or any other suitable type.

The gas compressor 76 is fluidly connected to the second chamber 46 via the second housing inlet 74. The gas compressor 76 is a pressurized-fluid source, specifically a gas source. The gas compressor 76 increases the pressure of a gas by reducing a volume of the gas or by forcing additional gas into a constant volume. The gas compressor 76 may be any suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type. The gas may be, e.g., air.

With reference to FIGS. 3 and 4, the rotatable barrier 42 includes a first barrier inlet 80 facing the first chamber 44 and a second barrier inlet 82 facing the second chamber 46. The first barrier inlet 80 is fluidly connected to the first nozzle 48 via a first channel 84, and the second barrier inlet 82 is fluidly connected to the second nozzle via a second channel 86. The first channel 84 extends from the first barrier inlet 80 through the rotatable barrier 42 and the central shaft 65 to a first supply line 88. The first supply line 88 extends from the central shaft 65 to first arm passages 90 of the arm 38. The first arm passages 90 extend through the arm 38 to the first nozzles 48. The second channel 86 extends from the second barrier inlet 82 through the rotatable barrier 42 and the central shaft 65 to a second supply line 92. The second supply line 92 extends from the central shaft 65 to second arm passages 94 of the arm 38. The second arm passages 94 extend through the arm 38 to the second nozzles 50. The first and second channels 84, 86 may be hollowed-out passages through solid material of the rotatable barrier 42 and the central shaft 65. The path of the fluid from the first chamber 44 to the first nozzles 48 is fluidly isolated from the path of fluid from the second chamber 46 to the second nozzles 50.

Returning to FIG. 2, the arm 38 is rotatable by the actuator 36 about the axis A. The central shaft 65 may be fixed to a disc 96 centered on the axis A, and the arm 38 may extend from a periphery of the disc 96. The arm 38 and the disc 96 rotate together with the central shaft 65 and the rotatable barrier 42.

The arm 38 includes a wiper blade 98. The wiper blade 98 contacts the sensor window 61, and as the arm 38 rotates, the wiper blade 98 slides along contacting the sensor window 61. The wiper blade 98 may have a wedge shape with a point of the wedge contacting the sensor window 61. The wiper blade 98 can wipe away debris from the sensor window 61. The wiper blade 98 is oriented axially relative to the sensor window 61, i.e., is elongated substantially parallel to the axis A.

With reference to FIG. 5, the first nozzles 48 are positioned to emit fluid toward the sensor window 61 on a first side of the wiper blade 98, and the second nozzles 50 are positioned to emit fluid toward the sensor window 61 on a second, opposite side of the wiper blade 98. There may be one or multiple first nozzles 48, and there may be one or multiple second nozzles 50.

In operation, the liquid pump 78 pressurizes the first chamber 44, and the higher pressure in the first chamber 44 causes the arm 38 to rotate in a first direction about the axis A and causes air to travel into the first barrier inlet 80 and out of the first nozzles 48. The wiper blade 98 wipes over an area of the sensor window 61 recently wetted by the first nozzles 48. The gas compressor 76 pressurizes the second chamber 46, and the higher pressure in the second chamber 46 causes the arm 38 to rotate in a second direction about the axis A and causes liquid to travel into the second barrier inlet 82 and out of the second nozzles 50. The rotatable barrier 42 is rotatable by relative pressures of the chambers 44, 46. When the pressure of the first chamber 44 increases, the rotatable barrier 42 rotates so that the volume of the first chamber 44 grows and the volume of the second chamber 46 shrinks. When the pressure of the second chamber 46 increases, the rotatable barrier 42 rotates so that the volume of the first chamber 44 shrinks and the volume of the second chamber 46 grows.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A cleaning system, comprising:
an actuator including a housing and a rotatable barrier in the housing defining a first chamber and a second chamber, the rotatable barrier rotatable by relative pressures of the chambers; and
an arm rotatable by the actuator and including a first nozzle fluidly connected to the first chamber and a second nozzle fluidly connected to the second chamber.

2. The cleaning system of claim 1, wherein the arm includes a wiper blade.

3. The cleaning system of claim 2, wherein the first and second nozzles are positioned to emit fluid on respective first and second sides of the wiper blade.

4. The cleaning system of claim 1, wherein the housing includes a cylindrical outer wall, the actuator includes a central shaft, and the rotatable barrier extends from the central shaft to the outer wall.

5. The cleaning system of claim 4, wherein the actuator includes a fixed barrier extending from the central shaft to the outer wall.

6. The cleaning system of claim 5, wherein the rotatable barrier is rotatable about an axis defined by the central shaft from a first position through a rotational sweep of at least 270° to a second position.

7. The cleaning system of claim 6, wherein the fixed barrier is outside the rotational sweep of the rotatable barrier.

8. The cleaning system of claim 7, wherein the housing includes a first housing inlet to the first chamber outside the rotational sweep and a second housing inlet to the second chamber outside the rotational sweep, and the fixed barrier is between the housing inlets.

9. The cleaning system of claim 1, wherein the rotatable barrier includes a first barrier inlet facing the first chamber and fluidly connected to the first nozzle, and a second barrier inlet facing the second chamber and fluidly connected to the second nozzle.

10. The cleaning system of claim 9, wherein the actuator includes a central shaft defining an axis about which the rotatable barrier is rotatable, a first channel extending from the first barrier inlet through the rotatable barrier and central shaft and fluidly connected to the first nozzle, and a second channel extending from the second barrier inlet through the rotatable barrier and central shaft and fluidly connected to the second nozzle.

11. The cleaning system of claim 1, wherein a liquid pump is fluidly connected to the first chamber.

12. The cleaning system of claim 1, wherein a gas compressor is fluidly connected to the second chamber.

13. The cleaning system of claim 1, further comprising a cylindrical sensor window, wherein the arm is rotatable about an axis defined by the sensor window.

14. The cleaning system of claim 13, wherein the arm includes a wiper blade oriented axially relative to the sensor window.

* * * * *